United States Patent [19]

Koide et al.

[11] Patent Number: 5,425,795
[45] Date of Patent: Jun. 20, 1995

[54] METHOD FOR PULLING-UP A POROUS SILICA GLASS PREFORM

[75] Inventors: Hiroyuki Koide; Masami Terashima; Hideo Hirasawa; Kazuhiro Hamaguchi, all of Gunma, Japan

[73] Assignee: Shin-Etsu Chemical Co., Ltd., Tokyo, Japan

[21] Appl. No.: 206,522

[22] Filed: Mar. 4, 1994

[30] Foreign Application Priority Data

Mar. 18, 1993 [JP] Japan .................................. 5-058590

[51] Int. Cl.$^6$ ............................................ C03B 37/018
[52] U.S. Cl. .......................................... 65/381; 65/385; 65/414; 414/210
[58] Field of Search .................. 65/414, 427, 381, 385, 65/540, 260; 414/22.68, 22.63, 210, 24, 14

[56] References Cited

U.S. PATENT DOCUMENTS

| | | | |
|---|---|---|---|
| 1,213,285 | 1/1917 | Slingluff | 414/24 |
| 3,981,369 | 9/1976 | Bokenkamp | 414/22.68 |
| 4,350,569 | 9/1982 | Helgeland | 414/210 |
| 4,738,321 | 4/1988 | Olivier | 414/22.68 |
| 4,801,324 | 1/1989 | Hyland | 65/381 |
| 4,906,268 | 3/1990 | Lane | 65/427 |
| 5,221,309 | 6/1993 | Kyoto | 65/427 |

Primary Examiner—W. Gary Jones
Assistant Examiner—John Hoffmann
Attorney, Agent, or Firm—McAulay Fisher Nissen Goldberg & Kiel

[57] ABSTRACT

An improvement is proposed in the process for the preparation of a porous silica glass preform as a precursor of optical fibers by the VAD method, in which fine silica particles produced by the flame hydrolysis of a silicon-containing compound are deposited on the lower end of a seed rod suspended at the lower end of a suspender rod rotated by a carriage in a vertical tubular reactor furnace to grow in the vertical direction. Instead of taking the fully grown porous preform out of the tubular furnace by pulling up as suspended on the suspender rod as is undertaken in the prior art, the seed rod is temporarily held by clamping with a holding device with disconnection from the suspender rod and the porous preform and seed rod are pulled up by a separate vertical driving device so that the overall height of the apparatus can be greatly decreased contributing to a reduction of the manufacturing cost of optical fibers of silica glass.

1 Claim, 3 Drawing Sheets (a) → (b) → (c) → (d)

(a) → (b) → (c) → (d) → (e) → (f)

METHOD FOR PULLING-UP A POROUS SILICA GLASS PREFORM

BACKGROUND OF THE INVENTION

The present invention relates to an apparatus for pulling-up a porous silica glass preform as a precursor of optical fibers from a reactor furnace and a method for pulling-up a porous silica glass preform by using the apparatus. More particularly, the invention relates to an improved apparatus and an efficient method for pulling-up a porous silica glass preform from a reactor furnace free from the problems and disadvantages unavoidable when a porous silica glass preform having a large size is to be pulled up from the reactor furnace in a conventional apparatus and method.

The porous silica glass preform mentioned above as a precursor of silica glass optical fibers is produced mainly by the so-called VAD (vapor phase axial deposition) method, in which a gaseous feed of a volatile silicon-containing compound such as silicon tetrachloride with optional admixture of a dopant such as germanium tetrachloride is subjected to flame hydrolysis in an oxyhydrogen flame to form fine particles of silica which are deposited on the lower end of a vertically held and rotating seed rod made from fused silica glass forming a porous silica body which grows in the axial or vertical direction as the deposition of silica particles proceeds to give an elongated porous rod of silica glass to be subsequently subjected to sintering and vitrification to give a transparent silica glass preform. Therefore, an apparatus is indispensable in the above described process for pulling up the growing porous silica glass preform out of the reactor furnace for the flame hydrolysis in the vertical direction at a velocity corresponding to the growing velocity of the porous body finally to remove the fully grown porous body away from above the reactor furnace to prepare for the next step.

In order to comply with the rapidly growing demand for optical fibers of silica glass in recent years, the porous silica glass preform in the form of a rod prepared by the above described method is also required to have a large size with a length of 2000 mm or even longer. In view of the fact that the fine silica particles formed by the flame hydrolysis in a vertically elongated reactor furnace are deposited on the lower end of a seed rod which in turn is held at the lower end of a suspender rod supported and moved in the vertical direction with rotation by a carrying means or a carriage, it is readily understood that the apparatus for pulling up the porous silica glass preform of a so large length must have a very large height including the lengths of the porous preform as grown, seed rod and suspender rod, the length of which must be sufficiently large to cover the stroke corresponding to the length of the preform. For example, the suspender rod must have a length of about 2500 mm when a 2000 mm long porous preform is to be pulled up from the reactor furnace so that the effective up-and-down stroke of the carriage must be about 4800 mm or longer and the overall height of the preform-manufacturing apparatus sometimes exceeds 9 meters or even larger.

It may be too much to say that an apparatus having a so large height is accompanied by several disadvantages. Firstly, the cost for constructing such a large apparatus is necessarily very high as compared with the cost for a more compact apparatus. Secondly, a serious problem is caused relative to the accuracy of the rotating movement of the suspender rod which is rotated unavoidably with eccentricity when the length thereof is great since the suspender rod is held by the carriage only at the upper part to greatly affect the uniformity of the porous glass preform. Thirdly, the plant house in which the apparatus is installed must be high enough as a matter of course which is built with a very large construction investment and requires a large amount of maintenance costs. In sum, the height of the preform pulling-up apparatus is one of the important determinant factors of the costs for the manufacture of optical fibers because of the large investment therefor and the limitation in the improvement of the productivity.

SUMMARY OF THE INVENTION

The present invention accordingly has an object to provide a novel and efficient method for pulling up a porous silica glass preform grown in a reactor furnace for flame hydrolysis on the lower end of a seed rod which in turn is held at the lower end of a vertical suspender rod and a pulling-up apparatus therefor.

Thus, the apparatus of the present invention, which is an apparatus for pulling up a porous silica glass preform in the form of an elongated rod as grown in a reactor furnace on the lower end of a seed rod which in turn is held at the lower end of a vertical suspender rod movable in the vertical direction, comprises:

(a) a carriage for rotating the suspender rod;
(b) a means for moving the carriage in the vertical direction;
(c) a means for moving the carriage in the horizontal direction; and
(d) a means for holding the porous glass preform by clamping the seed rod.

In particular, it is preferable that the carriage per se is provided with the means for holding the porous silica glass preform by clamping the seed rod.

Further, the method of the present invention, which is a method for the preparation of a porous silica glass preform in the form of a rod by the VAD method, comprises the steps of:

(A) depositing fine particles of silica formed by the flame hydrolysis of a volatile silicon-containing compound on the lower end of a seed rod connected to the lower end of a suspender rod vertically held and rotated by a carriage and upwardly moved in the vertical direction by a vertical driving device;
(B) fixing the porous silica glass preform by clamping at the seed rod with a holding device;
(C) disconnecting the suspender rod from the seed rod;
(D) moving the suspender rod and the carriage holding the same in the horizontal direction away from above the porous silica glass preform;
(E) connecting the seed rod to a vertical driving device; and
(F) pulling up the porous silica glass preform upwardly by the vertical driving device.

DETAILED DESCRIPTION OF THE PREFERRED EMBODIMENTS

Preceding the description of the inventive apparatus and method, description is given in the following by making reference to FIG. 3 of the accompanying drawing showing a conventional apparatus and method for pulling up a porous silica glass preform as grown in a reactor furnace.

Figure 3:
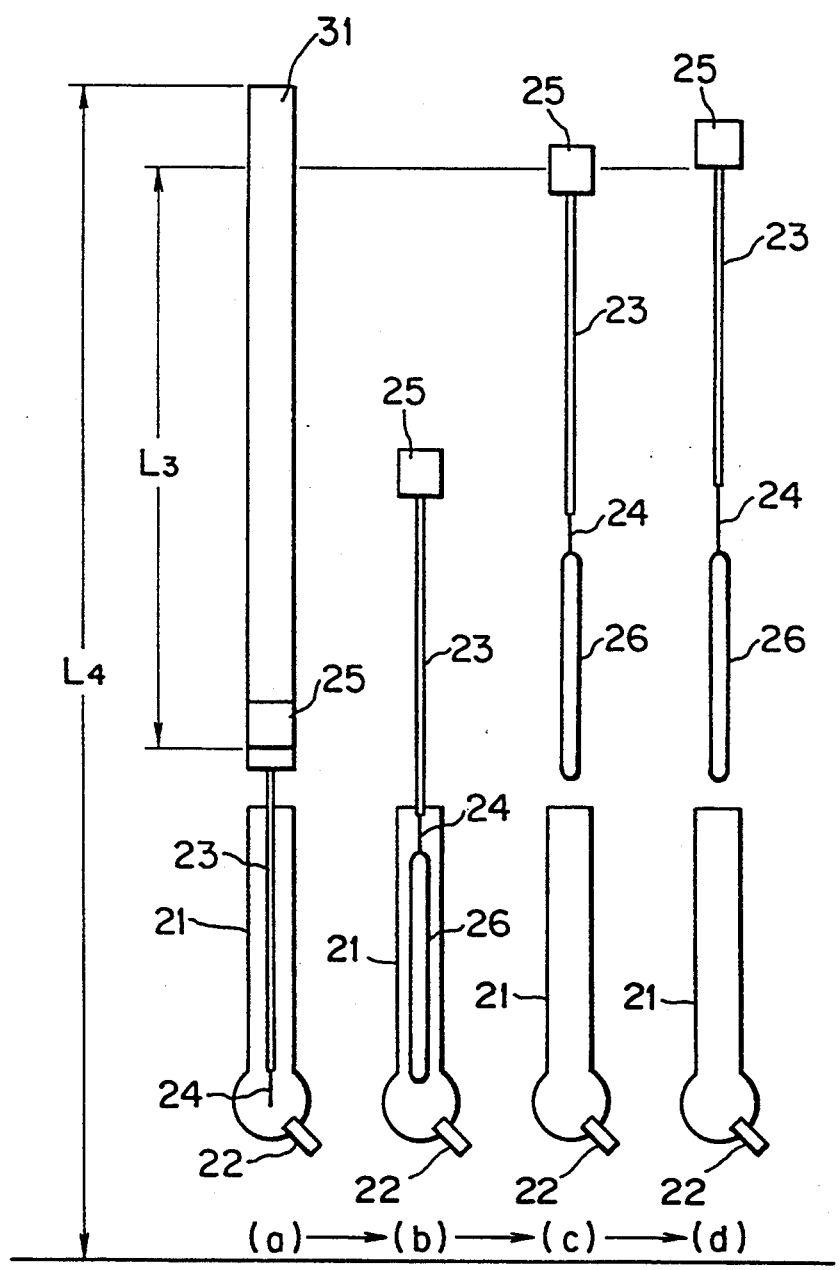
FIG. 3 is a schematic illustration of a conventional apparatus and method in the prior art which is performed in the sequential order of steps shown by (a), (b), (c) and (d).

As is shown by (a) of FIG. 3 indicating the height relationship of the respective parts, a seed rod 24 connected to the lower end of a vertical suspender rod 23, which can be rotated by means of a carriage 25, is suspended in a tubular reactor furnace 21 at such a height that the lower end of the seed rod 24 is in the vicinity of the nozzle of a burner 22 for producing an oxyhydrogen flame. Fine particles of silica are produced by the flame hydrolysis of a volatile silicon-containing compound in the oxyhydrogen flame formed by the burner 22 and deposited on the lower end of the seed rod 24 under rotation by means of the carriage 25 to form a porous deposit of silica particles which grows in the axial or vertical direction. As the deposit of silica particles grows, the assembly of the seed rod 24 and the suspender rod 23 is pulled up upwardly by moving the carriage 25 along the guide 31 at a rate corresponding to the growth rate of the porous deposit of silica particles finally to obtain a porous silica glass preform 26 having a length of, for example, 2000 mm shown by (b) of FIG. 3. In order that the thus grown preform 26 as a whole is still in the tubular reactor furnace 21, the suspender rod must be substantially longer than 2000 mm as is readily understood from the figure or usually has a length of about 2500 mm.

In the next place, the porous silica glass preform 26 is taken out of the tubular reactor furnace 21 by further pulling up until the lower end thereof is at a height above the upper end of the tubular reactor furnace 21 as is shown by (c) in FIG. 3. Accordingly, the stroke of the carriage 25 in the vertical direction there is $L_3$ which is a total of the lengths of the porous body 26, e.g., 2000 mm, seed rod 24, e.g., 300 mm, and suspender rod, e.g., 2500 mm or 4800 mm as is shown by (d) in FIG. 3. Thus, the porous preform-growing apparatus has an overall height $L_4$ which is substantially larger than 9000 mm or, for example, as large as 9300 mm.

Figure 1:
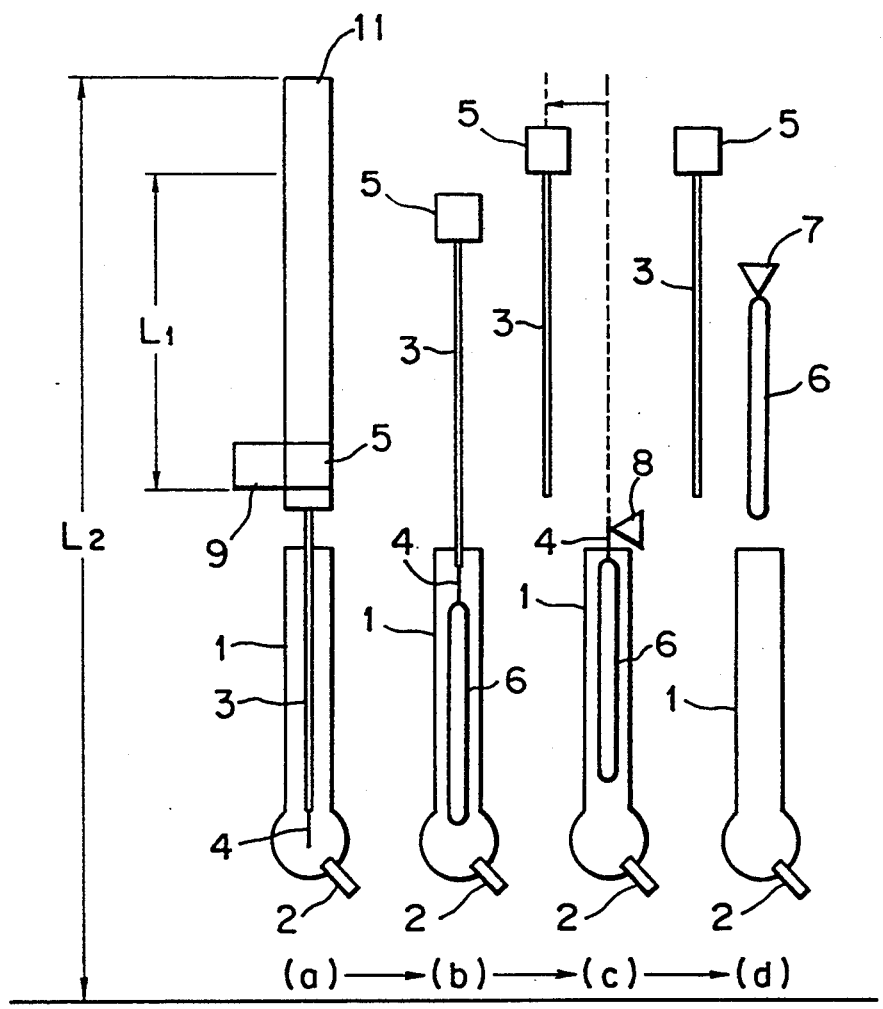
FIG. 1 is a schematic illustration of the inventive apparatus and method which is performed in the sequential order of steps shown by (a), (b), (c) and (d).

The present invention provides a means to dissolve the disadvantages accompanying the so high apparatus as described above. As is illustrated by (a) in FIG. 1, the seed rod 4 connected to the lower end of a suspender rod 3 is inserted into the tubular reactor furnace 1 and held at such a height that the lower end of the seed rod 3 is in the vicinity of the nozzle of the burner 2 for forming an oxyhydrogen flame. The procedure up to the formation of the porous silica glass preform 6 shown in (b) of FIG. 1 is the same as in the conventional method illustrated in FIG. 3 by gradually pulling up the suspender rod 3 by moving the carriage 5 upwardly along the guide 11. Here, the porous body 6 as grown is still in the tubular reactor furnace 1 while the seed rod 4 has made appearance above the upper end of the tubular reactor furnace 1.

Instead of further moving the carriage 5 upwardly to pull up the porous silica glass preform 6 to the height where the lower end of the preform 6 is higher than the upper end of the tubular reactor furnace i as in the conventional method, the seed rod 4 is temporarily held by clamping with a holding device 8 as is shown by (c) of FIG. 1 and the suspender rod 3 is disconnected from the seed rod 4. The thus disconnected suspender rod 3 is moved in the horizontal direction by means of the horizontal driving device 9 to be removed away from above the porous preform 6. The carriage 5 and the suspender rod 3 need not be moved upwardly any further. Thereafter, the seed rod 4 is connected to a vertical driving device followed by unclamping of the holding device 8 from the seed rod and the porous preform 6 is pulled up by means of the vertical driving device 7 until the lower end of the preform 6 is at a height higher than the upper end of the tubular reactor furnace 1.

In this case, it is readily understood from FIG. 1 that the driving stroke $L_1$ of the carriage 5 and the suspender rod 3 can be equal to or somewhat larger than the length of the suspender rod 3. When the porous preform 6 has a length of 2000 mm and the suspender rod 3 has a length of 2500 mm, for example, the stroke $L_1$ can be as small as 2600 mm and the overall height $L_2$ of the apparatus can be 7300 mm.

Figure 2:
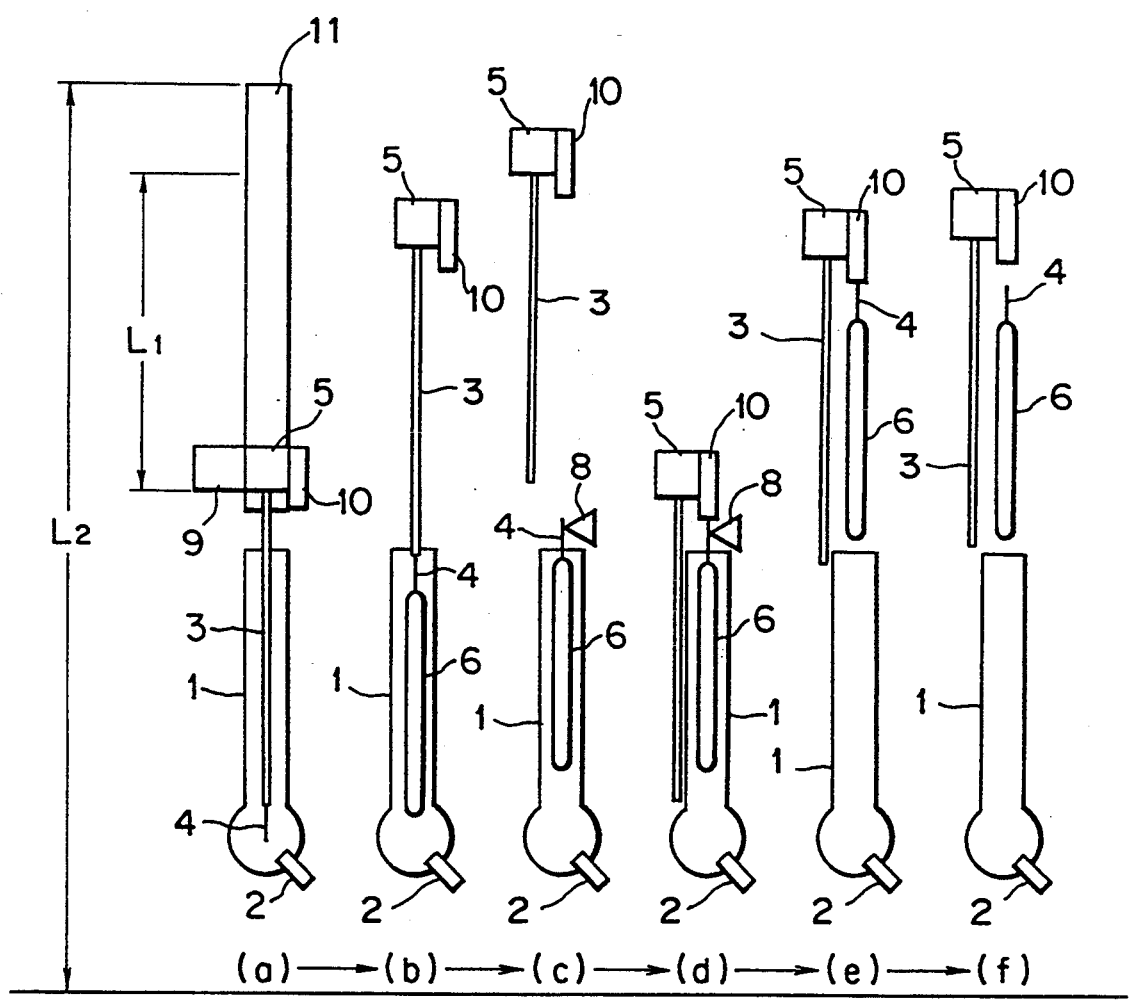
FIG. 2 is a schematic illustration of the inventive apparatus and method in an alternative embodiment which is performed in the sequential order of steps shown by (a) to (f).

FIG. 2 illustrates an alternative embodiment of the inventive apparatus and method, in which the procedure of (a), (b) and (c) is about the same as in (a), (b) and (c) of FIG. 1 up to the step of temporary holding of the seed rod 4 by clamping with a holding device 8 and horizontal movement of the carriage 5 and the suspender rod 3 away from above the preform 6. Instead of providing a separate vertical driving device 7 shown in (d) of FIG. 1, an integral holding device 10 is provided on the side surface of the carriage 5 and, when the carriage 5 is horizontally moved away from above the preform 6, the holding device 10 comes just above the preform 6 so that, when the carriage 5 is lowered as is shown by (d) of FIG. 2, the holding device 10 reaches the seed rod 4 held by the holding device 8 and can be connected thereto followed by disconnection of the holding device 8 from the seed rod 4. Thereafter, the carriage 5 and holding means 10 are moved together upwardly to pull up the porous preform 6 until the lower end thereof comes to a height above the upper end of the tubular reactor furnace 1 as is shown by (e) of FIG. 2 followed by disconnection of the vertical driving device 10 as is shown by (f) of FIG. 2 from the seed rod 4 while the porous preform is supported by a carrying device (not shown in the figure) to be carried away for the next process of sintering and vitrification in a sintering furnace (not shown in the figure) so that the carriage 5 and the suspender rod 3 are ready for the next run of porous preform growing.

In the following, the apparatus and method of the invention are illustrated in more detail by way of an example and a comparative example.

EXAMPLE 1

The apparatus used here was substantially identical with that illustrated in FIG. 1, of which the tubular reactor furnace 1 was made from a fused silica glass and had an inner diameter of 200 mm and a length of 2700 m. A seed rod 4 of fused silica glass having a diameter of 20 mm and a length of 400 mm connected to the lower end of a suspender rod 3 of a refractory material having a length of 2500 mm was vertically held in the reactor furnace 1 as suspended from a carriage 5. Flame hydrolysis of silicon tetrachloride was started by introducing a vapor thereof admixed with a small amount of germanium tetrachloride as a dopant into the oxyhydrogen flame formed on the burner nozzle and the silica particles are deposited on the lower end of the seed rod 4 under rotation to form a deposit of the silica particles.

As the deposit of silica particles grows with a diameter of 150 mm, the carriage 5 was gradually moved upwardly at a rate equal to the growth rate of the silica particle deposit and, when the length of the rod-formed silica particle deposit reached 2000 mm, the flame hydrolysis was terminated to complete a porous silica glass preform 6.

Thereafter, the porous preform 6 was temporarily held by clamping the seed rod 4 appearing above the upper end of the tubular reactor furnace i with a holding device 8 and the suspender rod was disconnected from the seed rod 4 followed by a horizontal movement of the carriage 5 together with the suspender rod 3 by a distance of 400 mm to be removed away from above the porous preform 6 by means of the horizontal driving device 9. Further, the seed rod 4 was connected to a vertical driving device 7 at the top end thereof with unclamping of the temporary holding device 8 therefrom and the porous preform 6 was taken out of the tubular furnace i upwardly by means of the vertical driving device 7 until the lower end of the preform 6 was at a height substantially higher than the upper end of the tubular reactor furnace 1.

The porous silica glass preform 6 taken out of the furnace 1 in the above described manner was brought to a sintering furnace and subjected there to the treatment of sintering and vitrification in a conventional manner to give a transparent silica glass preform which was examined for the variation in the difference of the specific refractive index $\Delta n$ which was as small as $0.35 \pm 0.003\%$.

The effective stroke of the pulling-up apparatus used here was 2600 mm and the overall height of the porous preform-growing apparatus was 7300 mm.

COMPARATIVE EXAMPLE

A porous silica glass preform having a diameter of 150 mm and a length of 2000 mm was grown in an apparatus and by the method illustrated in FIG. 3 followed by sintering and vitrification in the same manner as in Example. The thus obtained transparent silica glass preform was examined for the variation in the difference of the specific refractive index $\Delta n$ which was $0.35 \pm 0.015\%$.

The effective stroke of the pulling-up apparatus used here was 4800 mm and the overall height of the porous preform-growing apparatus was 9300 mm.

EXAMPLE 2

The apparatus used in this example was that illustrated in FIG. 2 in which a holding device 10 was provided integrally on the side surface of the carriage 5 differently from the embodiment illustrated in FIG. 1, the porous silica glass preform 6 was held by the holding device 10 and pulled up by moving, instead of the separate vertical driving device 7 in FIG. 1, the carriage 5 in the vertical direction The apparatus could be as compact as in Example 1.

What is claimed is:

1. A method for the preparation of a porous silica glass preform in the form of a rod by the VAD method which comprises the steps of:
   (A) flame hydrolyzing a volatile silicon-containing compound to deposit fine particles on a lower end of a seed rod connected to a lower end of a vertically held suspender rod which is being rotated by a carriage and moved upwardly in the vertical direction by a pulling-up device to form a porous silica glass preform;
   (B) fixing the porous silica glass preform by clamping the seed rod with a holding device;
   (C) disconnecting the suspender rod from the seed rod;
   (D) moving the suspender rod and the carriage holding the same in the horizontal direction away from above the porous silica glass preform;
   (E) connecting the seed rod to a pulling-up device; and
   (F) pulling up the porous silica glass preform upwardly by the pulling-up device.

* * * * *